(12) United States Patent
Hattori et al.

(10) Patent No.: US 11,801,660 B2
(45) Date of Patent: Oct. 31, 2023

(54) LAMINATED ACOUSTIC ABSORPTION MEMBER

(71) Applicants: JNC CORPORATION, Tokyo (JP); JNC FIBERS CORPORATION, Tokyo (JP)

(72) Inventors: Takayuki Hattori, Shiga (JP); Hidemi Ito, Shiga (JP)

(73) Assignees: JNC CORPORATION, Tokyo (JP); JNC FIBERS CORPORATION, Tokyo (JP)

( * ) Notice: Subject to any disclaimer, the term of this patent is extended or adjusted under 35 U.S.C. 154(b) by 518 days.

(21) Appl. No.: 16/978,712

(22) PCT Filed: Feb. 26, 2019

(86) PCT No.: PCT/JP2019/007271
§ 371 (c)(1),
(2) Date: Sep. 7, 2020

(87) PCT Pub. No.: WO2019/172016
PCT Pub. Date: Sep. 12, 2019

(65) Prior Publication Data
US 2021/0094258 A1    Apr. 1, 2021

(30) Foreign Application Priority Data

Mar. 8, 2018 (JP) .................... 2018-042044

(51) Int. Cl.
*B32B 5/26* (2006.01)
*B32B 27/02* (2006.01)
*G10K 11/168* (2006.01)

(52) U.S. Cl.
CPC ............. *B32B 5/26* (2013.01); *B32B 27/02* (2013.01); *G10K 11/168* (2013.01);
(Continued)

(58) Field of Classification Search
CPC ...... B32B 2307/102; B32B 2262/0284; B32B 2262/0261; B32B 27/02; B32B 5/26; G10K 11/168
(Continued)

(56) References Cited

U.S. PATENT DOCUMENTS

| 10,174,499 B1 * | 1/2019 | Tinianov | E04B 1/86 |
| 2010/0065368 A1 * | 3/2010 | Tazian | B29C 43/203 |
| | | | 181/290 |

(Continued)

FOREIGN PATENT DOCUMENTS

| CN | 102320171 | 1/2012 |
| CN | 104441876 | 3/2015 |

(Continued)

OTHER PUBLICATIONS

"Office Action of China Counterpart Application", dated Oct. 14, 2022, with English translation thereof, p. 1-p. 12.

(Continued)

*Primary Examiner* — Forrest M Phillips
(74) *Attorney, Agent, or Firm* — JCIPRNET

(57) ABSTRACT

A laminated acoustic absorption member that includes at least a first fiber layer and a second fiber layer, as well as at least one substrate layer present between the first fiber layer and the second fiber layer, wherein: the first fiber layer has an average flow pore diameter of 0.5-10 μm and a basis weight of 0.1-200 g/m²; the second fiber layer has an average flow pore diameter of 0.5-10 μm, the average flow pore diameter of the second fiber layer being equal to or less than that of the first fiber layer, and also has a basis weight of 0.1-200 g/m²; the substrate layer has an air permeability of 40 cc/cm²·s or greater as measured by the Frazier method, and a basis weight of 1-700 g/m²; and the first fiber layer and (Continued)

the second fiber layer are disposed on a sound-incidence side and a sound-transmission side, respectively.

7 Claims, 1 Drawing Sheet

(52) U.S. Cl.
CPC ............. *B32B 2262/0261* (2013.01); *B32B 2262/0284* (2013.01); *B32B 2307/102* (2013.01)

(58) Field of Classification Search
USPC .......................................................... 181/290
See application file for complete search history.

(56) References Cited

U.S. PATENT DOCUMENTS

| | | | | |
|---|---|---|---|---|
| 2013/0112499 A1* | 5/2013 | Kitchen | ............... | G10K 11/168 442/268 |
| 2018/0144734 A1* | 5/2018 | Wang | ..................... | B32B 27/40 |
| 2019/0232626 A1* | 8/2019 | Lu | ........................... | B32B 3/263 |

FOREIGN PATENT DOCUMENTS

| | | |
|---|---|---|
| CN | 105599400 | 5/2016 |
| DE | 202014102942 X | 10/2015 |
| JP | 2004019062 | 1/2004 |
| JP | 2004021037 | 1/2004 |
| JP | 2008065046 | 3/2008 |
| JP | 2008537798 | 9/2008 |
| JP | 2010085873 | 4/2010 |
| JP | 2011508113 | 3/2011 |
| JP | 2011110773 | 6/2011 |
| JP | 2015030218 | 2/2015 |
| JP | 2016121426 | 7/2016 |
| JP | 2018146942 | 9/2018 |
| JP | 2018169555 | 11/2018 |
| JP | 2018199253 | 12/2018 |
| JP | 2019001012 | 1/2019 |
| WO | WO-2007047263 A1 * | 4/2007 ............ B32B 27/12 |
| WO | 2018143430 | 8/2018 |
| WO | 2019026798 | 2/2019 |

OTHER PUBLICATIONS

"International Search Report (Form PCT/ISA/210)"of PCT/JJP2019/007271, dated May 21, 2019, with English translation thereof, pp. 1-4.

"Office Action of China Counterpart Application" with English translation thereof, dated May 9, 2022, p. 1-p. 18.

* cited by examiner

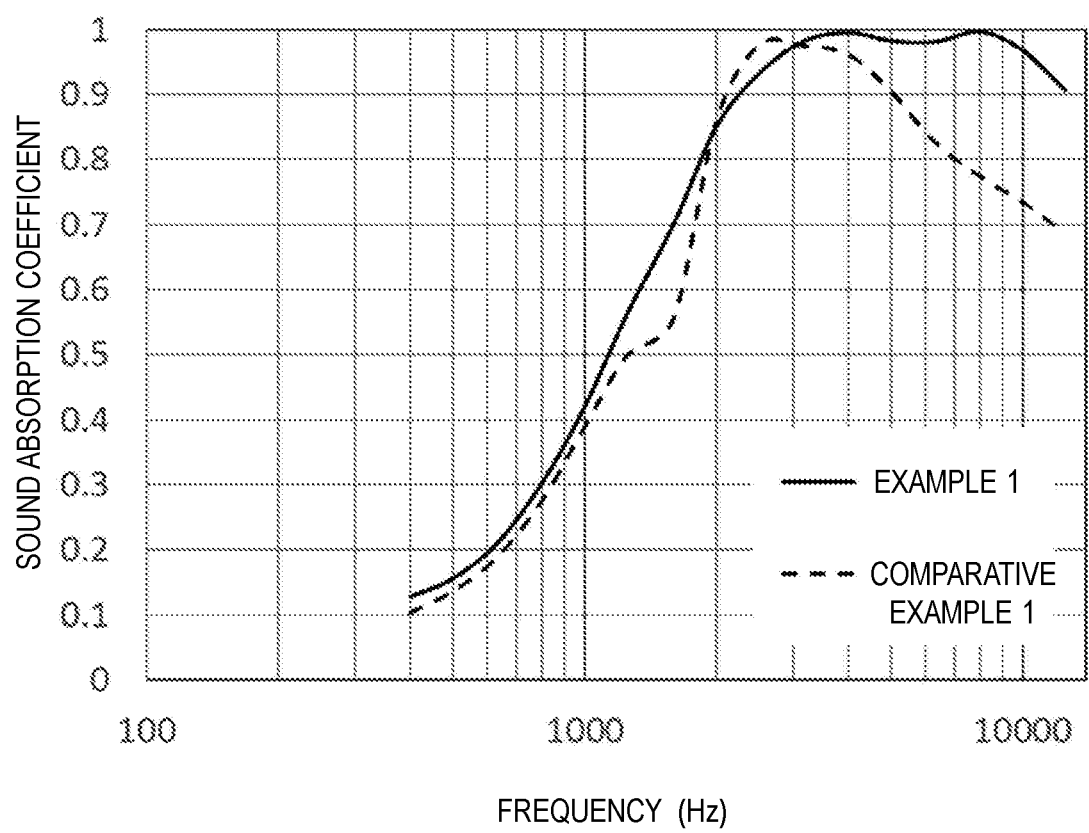

LAMINATED ACOUSTIC ABSORPTION MEMBER

CROSS-REFERENCE TO RELATED APPLICATION

This application is a 371 application of the international PCT application serial no. PCT/JP2019/007271, filed on Feb. 26, 2019, which claims the priority benefit of Japan application no. 2018-042044, filed on Mar. 8, 2018. The entirety of each of the above-mentioned patent applications is hereby incorporated by reference herein and made a part of this specification.

TECHNICAL FIELD

The present invention relates to an acoustic absorption member having a laminate structure in which at least two types of fiber layers are laminated.

BACKGROUND ART

Acoustic absorption members are products having a function of absorbing sound, and are widely used in the field of construction and field of automobiles. It is known that a non-woven fabric is used as a material constituting an acoustic absorption member. For example, Patent Literature 1 discloses a composite non-woven fabric web including submicron fibers having a median diameter of less than 1 µm and microfibers having a median diameter of at least 1 µm. In the composite non-woven fabric web in Patent Literature 1, two types of fibers having different median diameters (submicron fibers and microfibers) are mixed, and when its mixing ratio is changed, a gradient of the mixing ratio is formed in the thickness direction. In an exemplary embodiment, it is disclosed that, when a microfiber flow and a submicron fiber flow are formed separately and the submicron fiber flow is added to the microfiber flow, it is possible to form a web in which different fibers are mixed.

In addition, Patent Literature 2 discloses a laminated sound absorbing non-woven fabric which absorbs low frequency and high frequency sound, and which includes a resonance film and at least one other fiber material layer, and in which the resonance film is composed of a layer of nanofibers having a diameter of up to 600 nm and a surface weight (basis weight) of 0.1 to 5 g/m$^2$. The nanofiber layer is typically formed by electrospinning. On the other hand, it is disclosed that a substrate layer is composed of a fiber fabric having a diameter of 10 µm to 45 µm and a basis weight of 5 to 100 g/m$^2$, and other layers may be additionally laminated thereon. In addition, it is disclosed that additional lamination may be performed on the laminate in order to obtain an appropriate thickness and basis weight.

Patent Literature 3 discloses a laminated acoustic absorption member which has a sound absorption coefficient of 0.85 or more at 2,000 Hz, and in which a non-woven fabric A including (1) a layer composed of nanofibers having a single fiber diameter of 1 to 500 nm and made of a thermoplastic resin and (2) a layer composed of fibers having a larger single fiber diameter than the above layer, and a non-woven fabric B having a specific basis weight and fiber diameter are laminated. It is disclosed in Patent Literature 3 that the laminated acoustic absorption member is produced by adhering a non-woven fabric A (surface layer part) having shape retainability and dimensional stability by supporting a layer having very fine voids composed of nanofibers with a layer having a larger short fiber diameter than the above layer to a non-woven fabric B (base part) having sufficient air permeability and a large basis weight, and also has an improved sound absorption property and has a thermal insulation property.

Patent Literature 4 discloses a non-woven fabric structure including nanofibers and having an excellent sound absorption property. The non-woven fabric structure in Patent Literature 4 includes a fibrous component including nanofibers having a fiber diameter of less than 1 µm, and in which the thickness of the fibrous component is 10 mm or more. In addition, it is disclosed that the fibrous component may be supported on a support or may have a structure in which a fibrous component and a support are repeatedly laminated. It is disclosed that nanofibers are formed by, for example, a melt blown method, and in an example, a layer formed of a nano fibrous component having a fiber diameter of 0.5 µm and a basis weight of 350 g/m$^2$ is formed on a polypropylene spunlace non-woven fabric as a support.

CITATION LIST

Patent Literature

[Patent Literature 1]
Published Japanese Translation No. 2011-508113 of the PCT International Publication
[Patent Literature 2]
Published Japanese Translation No. 2008-537798 of the PCT International Publication
[Patent Literature 3]
Japanese Patent Laid-Open No. 2015-30218
[Patent Literature 4]
Japanese Patent Laid-Open No. 2016-121426

SUMMARY OF INVENTION

Technical Problem

As described above, non-woven fabric laminates having various configurations have been studied as acoustic absorption members, and it is known that microfibers called nanofibers or submicron fibers may be used in combination with other fibers, and a characteristic sound absorption property is exhibited depending on combinations and configurations of layers.

However, an acoustic absorption member exhibiting excellent sound absorption performance not only in a low-frequency range of 500 to 1,000 Hz, and an intermediate-frequency range of 800 to 2,000 Hz but also in a high-frequency range of 2,000 to 5,000 Hz and an ultra-high-frequency range of 5,000 to 11,000 Hz, and having excellent space saving is required, but has not yet been developed. In view of such circumstances, the present invention provides an acoustic absorption member exhibiting an excellent sound absorption property in all ranges including a low-frequency range, an intermediate-frequency range, a high-frequency range, and an ultra-high-frequency range.

Solution to Problem

The inventors conducted extensive studies in order to address the above problems. As a result, in a laminated acoustic absorption member including a substrate layer and fiber layers, it was found that a laminated acoustic absorption member which includes at least two fiber layers having an air permeability in a specific range (average flow pore diameter) and a substrate layer having a porosity and a density in specific ranges therebetween, and in which the two fiber layers have a specific disposition exhibits an excellent sound absorption property in a low-frequency range to an ultra-high-frequency range, and excellent space saving, and the present invention was completed.

The present invention has the following configurations.

[1] A laminated acoustic absorption member including at least a first fiber layer and a second fiber layer, and at least one substrate layer interposed between the first fiber layer and the second fiber layer, wherein the first fiber layer has an average flow pore diameter of 0.5 to 10 μm and a basis weight of 0.1 to 200 g/m², wherein the second fiber layer has an average flow pore diameter of 0.5 to 10 μm, which is equal to or less than the average flow pore diameter of the first fiber layer, and has a basis weight of 0.1 to 200 g/m², wherein the substrate layer has an air permeability of 40 cc/cm²·s or more obtained by a Frazier method and has a basis weight of 1 to 700 g/m², and wherein the first fiber layer is disposed on a sound-incidence side and the second fiber layer is disposed on a sound-transmission side.

[2] The laminated acoustic absorption member according to [1], wherein the first fiber layer, the second fiber layer, and the substrate layer are independently at least one selected from the group consisting of a non-woven fabric and a woven fabric.

[3] The laminated acoustic absorption member according to [1] or [2], wherein the substrate layer includes fibers formed of at least one fiber selected from the group consisting of polyethylene terephthalate, polybutylene terephthalate, polyethylene, and polypropylene, or fibers in which at least two thereof are combined, and the first fiber layer and the second fiber layer independently include at least one fiber selected from the group consisting of polyvinylidene fluoride, Nylon 6,6, polyacrylonitrile, polystyrene, polyurethane, polysulfone, polyvinyl alcohol, polyethylene terephthalate, polybutylene terephthalate, polyethylene, and polypropylene.

[4] The laminated acoustic absorption member according to any one of [1] to [3], wherein, in a normal incidence sound absorption coefficient measurement method, a sound absorption coefficient at a frequency of 900 Hz to 1,120 Hz is measured, an average sound absorption coefficient ($\alpha$) of the sound absorption coefficient is calculated, and the value of the average sound absorption coefficient ($\alpha$) is in a range that satisfies the following formula:

$1.00 \geq \alpha \geq 0.22.$

[5] The laminated acoustic absorption member according to any one of [1] to [4], wherein, in a normal incidence sound absorption coefficient measurement method, a sound absorption coefficient at a frequency of 2,800 Hz to 3,550 Hz is measured, an average sound absorption coefficient ($\beta$) of the sound absorption coefficient is calculated, and the value of the average sound absorption coefficient ($\beta$) is in a range that satisfies the following formula:

$1.00 \geq \beta \geq 0.60.$

[6] The laminated acoustic absorption member according to any one of [1] to [5], wherein, in a normal incidence sound absorption coefficient measurement method, a sound absorption coefficient at a frequency of 4,500 Hz to 5,600 Hz is measured, an average sound absorption coefficient ($\gamma$) of the sound absorption coefficient is calculated, and the value of the average sound absorption coefficient ($\gamma$) is in a range that satisfies the following formula:

$1.00 \geq \gamma \geq 0.90.$

[7] The laminated acoustic absorption member according to any one of [1] to [6], wherein, in a normal incidence sound absorption coefficient measurement method, a sound absorption coefficient at a frequency of 9,000 Hz to 11,200 Hz is measured, an average sound absorption coefficient ($\eta$) of the sound absorption coefficient is calculated, and the value of the average sound absorption coefficient ($\eta$) is in a range that satisfies the following formula:

$1.00 \geq \eta \geq 0.85.$

Advantageous Effects of Invention

According to the present invention having the above configuration, an acoustic absorption member having a particularly excellent sound absorption property in a low-frequency range to an ultra-high-frequency range is obtained. The sound absorption property of the laminated acoustic absorption member of the present invention has a peak in a range higher than that of acoustic absorption members in the related art, and there is an excellent sound absorption performance particularly in a range of 500 Hz or more. In the field of automobiles, according to increase in numbers of hybrid automobiles and electric automobiles, countermeasures against motor sound are becoming an issue, and regarding motor sound, sound in a low-frequency range to an ultra-high-frequency range are generated according to a rotational speed, and thus it can be said that countermeasures in these frequency ranges are necessary. In addition, it can be said that the range of wind noise is about 1,000 to 3,000 Hz. The laminated acoustic absorption member of the present invention is useful as a countermeasure against such noise. In addition, since the laminated acoustic absorption member of the present invention can be made lighter in weight and thinner in thickness than an acoustic absorption member made of a porous material, a glass fiber, or the like, it is possible to reduce the weight of the member and reduce the space it takes up, and these features are particularly useful for an acoustic absorption member in the field of automobiles.

BRIEF DESCRIPTION OF DRAWINGS

FIG. 1 is a graph showing a sound absorption property of an example (Example 1) of the present invention and a comparative example (Comparative Example 1).

DESCRIPTION OF EMBODIMENTS

Hereinafter, the present invention will be described in detail.

(Structure of Laminated Acoustic Absorption Member)

A laminated acoustic absorption member of the present invention includes a substrate layer and fiber layers of which each has an average flow pore diameter or air permeability in a specific range and a basis weight in a specific range. The laminated acoustic absorption member includes two or more fiber layers, and the substrate layer is interposed between the fiber layers.

Both the average flow pore diameter and the air permeability are indicators showing the degree of sparseness and density of the layer. The laminated acoustic absorption member of the present invention generally has a structure in which a sparse substrate layer is interposed between dense fiber layers, and has a structure in which fiber layers each have a specific density (average flow pore diameter) and are disposed so that the relationship of average flow pore diameter (incidence side)≥average flow pore diameter (transmission side) is satisfied.

The laminated acoustic absorption member of the present invention includes at least a first fiber layer and a second fiber layer, but it may include two to six fiber layers. Each of the first fiber layer and the second fiber layer may be composed of one fiber structure or a form in which a plurality of fiber structures are superimposed in one fiber layer may be used.

In addition, at least one substrate layer is interposed between the first fiber layer and the second fiber layer. The substrate layer may be composed of one substrate, or a form in which a plurality of substrate layers are superimposed in one substrate layer may be used. When the laminated acoustic absorption member includes two fiber layers including a first fiber layer and a second fiber layer, the laminated acoustic absorption member has a configuration of first fiber layer/substrate layer/second fiber layer. When the laminated acoustic absorption member includes three layers including a third fiber layer in addition to the first fiber layer and the second fiber layer, the laminated acoustic absorption member has a configuration of first fiber layer/substrate layer/third fiber layer/substrate layer/second fiber layer, with the average flow pore diameter of the third fiber layer preferably being such that the average flow pore diameter of the first fiber layer≥the average flow pore diameter of the third fiber layer≥the average flow pore diameter of the second fiber layer is satisfied.

The fiber layers and substrate layer included in the laminated acoustic absorption member may include components other than the fiber layer and the substrate layer as long as the effects of the present invention are not impaired, and for example, additional layers outside the scope defined in the present invention (for example, a protective layer; one protective layer or two or more protective layers may be used), a printing layer, a foam, a foil, a mesh, a woven fabric, and the like may be included. In addition, an adhesive layer, a clip, a suture, and the like for connecting respective layers may be included.

The layers of the laminated acoustic absorption member may or may not be physically and/or chemically adhered to each other as long as the air permeability is not significantly reduced. A form in which some gaps between the plurality of layers of the laminated acoustic absorption member are adhered and some are not adhered may be used. For the adhesion, for example, in a process of forming the fiber layer, or a post-process, heating is performed, some of fibers constituting the fiber layer are melted, the fiber layer is fused to the substrate layer, and thereby the fiber layer and the substrate layer may be adhered. In addition, it is preferable to apply an adhesive between the substrate layer and the fiber layer to adhere the layers.

The thickness of the laminated acoustic absorption member is not particularly limited as long as the effects of the present invention are obtained, and may be, for example, 1 to 50 mm, and is preferably 3 to 30 mm, and more preferably 3 to 20 mm in consideration of space saving. Here, the thickness of the laminated acoustic absorption member typically means a total thickness of the fiber layer and the substrate layer, and when other layers such as a protective layer are included, the thickness is a thickness of the member including the other layers. When an exterior body such as a cartridge and a lid is attached, the thickness of that part is not included.

The average flow pore diameters of the first fiber layer and the second fiber layer used in the laminated acoustic absorption member are not particularly limited as long as desired sound absorption performance is obtained, and a range of 0.5 to 10 μm can be used for the first fiber layer, a range of 0.5 to 10 μm can be used for the second fiber layer, and the average flow pore diameter of the second fiber layer is equal to or less than the average flow pore diameter of the first fiber layer, and preferably the average flow pore diameter of the second fiber layer is smaller than the average flow pore diameter of the first fiber layer. In the related art, in an acoustic absorption member expected to have sound absorption performance and sound insulation performance, it is thought that, when the average flow pore diameter is smaller, it is more difficult for sound to pass through and it is effective for sound insulation. On the other hand, in the laminated acoustic absorption member of the present invention, when the average flow pore diameters of the fiber layers disposed on both sides of the substrate layer are respectfully controlled, sound reflection is reduced, and when a layered configuration having an excellent sound absorption property is used, an improved sound absorption property is obtained.

The laminated acoustic absorption member has a laminate structure in which a substrate layer is interposed between a first fiber layer and a second fiber layer which is denser than the first fiber layer. In such a form, a distance between the first fiber layer and the second fiber layer (also referred to as a thickness of the substrate layer or an interlayer distance) is preferably 2.5 to 30 mm, and more preferably 3 to 15 mm. When the interlayer distance is 2.5 mm or more, sound absorption performance in a low-frequency range to an ultra-high-frequency range is favorable, and when the interlayer distance is 30 mm or less, the thickness of the acoustic absorption member does not become too large, and is suitable for space saving.

The air permeability of the substrate layer is not particularly limited as long as desired sound absorption performance is obtained, but the air permeability obtained by the Frazier method is 40 cc/cm$^2$·s or more, preferably 40 to 250 cc/cm$^2$·s, and more preferably 40 to 150 cc/cm$^2$·s. In the related art, in an acoustic absorption member expected to have sound absorption performance and sound insulation performance, it is thought that, when the air permeability is lower, it is difficult for sound to pass through, that is, it is effective for sound insulation. On the other hand, the laminated acoustic absorption member of the present invention has high air permeability, and thus sound reflection is reduced, and when a layered configuration having an excellent sound absorption property is used, an improved sound absorption property is obtained. Here, the air permeability can be measured by a known method, and can be measured by, for example, a Gurley testing machine method or a Frazier testing machine method.

(Configuration of Each Layer: Fiber Layer)

In the first fiber layer and the second fiber layer included in the laminated acoustic absorption member of the present invention, preferably, the porosity is 85% or more and 96% or less, and the density is 0.04 g/cm$^3$ or more and 0.5 g/cm$^3$ or less. When the porosity is 85% or more, this is preferable because the rigidity of the outer layer material is reduced, an increase in reflected waves is reduced, and sound waves can be guided into the acoustic absorption member. When the porosity is 96% or less, this is preferable because a flow resistance due to a density difference between the fiber layer and the substrate layer is controlled, sound is repeatedly reflected inside the acoustic absorption member due to a density difference between the outer layer and the inner layer, and sound inside the acoustic absorption member can be attenuated. In addition, when the density is 0.04 g/cm$^3$ or more, this is preferable for the acoustic absorption member because a rigidity at which a certain interlayer distance can be maintained is provided, and when the density is 0.5 g/cm³ or less, this is preferable for the acoustic absorption member because it is possible to maintain the reduced weight.

Fibers constituting the first fiber layer and the second fiber layer are preferably fibers having a fiber diameter of less than 10 µm. A fiber diameter of less than 10 µm means that the average fiber diameter is within this numerical value range. When the fiber diameter is less than 10 µm, this is preferable because a dense and thin film having a low porosity and a high density is obtained, and when the fiber diameter is less than 1 µm, this is more preferable because a dense and thin film having a lower porosity and a higher density is obtained. The fiber diameter can be measured by a known method. For example, the fiber diameter is a value obtained by measurement or calculation from an enlarged picture of the surface of the fiber layer, and the detailed measurement method will be described in detail in examples.

The first fiber layer and the second fiber layer are preferably formed of a non-woven fabric, and the average flow pore diameter is preferably less than 10 µm. When the average flow pore diameter is less than 10 µm, since it is possible to control a flow resistance between the fiber layer and the substrate layer, and sound is repeatedly reflected inside the acoustic absorption member, the sound inside the acoustic absorption member can be attenuated, which is favorable.

In the first fiber layer and the second fiber layer included in the laminated acoustic absorption member of the present invention, one fiber layer may be composed of one fiber structure, or a plurality of fiber aggregates may be included in one fiber layer, and layers of the fiber aggregates may be superimposed to form one fiber layer. Here, in this specification, a fiber aggregate means a fiber aggregate which has become one continuous component.

The average flow pore diameter of the first fiber layer is 0.5 to 10 µm, and preferably 0.9 to 10 µm. In addition, the basis weight of the first fiber layer is 0.1 to 200 g/m², and preferably 0.3 to 100 g/m². When the basis weight is 0.1 g/m² or more, a resonance space can be formed by forming a partition wall as a dense film, and the sound absorption property can be improved. When the basis weight is less than 200 g/m², the reflection of sound can be reduced and the sound absorption coefficient can be increased without increasing the rigidity of the film. The average flow pore diameter of the first fiber layer is equal to or larger than the average flow pore diameter of the second fiber layer.

The average flow pore diameter of the second fiber layer is 0.5 to 10 µm, preferably 0.5 to 5.0 µm, and particularly preferably 0.5 to 3.0 µm. In addition, the basis weight of the second fiber layer is 0.1 to 200 g/m², and preferably 0.3 to 100 g/m². When the basis weight is 0.1 g/m² or more, a resonance space can be formed by forming a partition wall as a dense film, and the sound absorption property can be improved, and when the basis weight is less than 200 g/m², the reflection of sound can be reduced, and the sound absorption coefficient can be increased without increasing the rigidity of the film.

In addition, in the laminated acoustic absorption member of the present invention, the first fiber layer is disposed on the sound-incidence side, and the second fiber layer is disposed on the sound-transmission side with the substrate layer therebetween. As described above, the second fiber layer is a denser layer than the first fiber layer. Without being bound by a specific theory, in the present invention, it is thought that sound is captured in the laminated acoustic absorption member using the first fiber layer, the captured sound is partially reflected at the dense second fiber layer, the reflected sound causes resonance, reflection, and interference in an enclosed space corresponding to the substrate layer part inside the acoustic absorption member, energy loss occurs due to conversion of vibration of the fibers of the substrate layer into heat, and thus excellent sound absorption performance is realized.

The fiber structure constituting the first fiber layer and the second fiber layer is preferably formed of a non-woven fabric, and the first fiber layer and the second fiber layer are not particularly limited as long as they have an average flow pore diameter and a basis weight within the above range, and for example, a melt blown non-woven fabric, a non-woven fabric formed by an electrospinning method, or the like is preferable. According to the electrospinning method or the melt blown method, microfibers can be efficiently laminated on the substrate, and a layer having a porosity and a density in desired ranges is obtained. The details of the electrospinning method will be described in detail in the production method.

The raw material resin of the fibers constituting the first fiber layer and the second fiber layer is not particularly limited as long as the effects of the invention are obtained, and examples thereof include polyesters such as a polyolefin resin, polyurethane, polylactic acid, an acrylic resin, polyethylene terephthalate and polybutylene terephthalate, Nylon (amide resin) such as Nylon 6, Nylon 6,6, and Nylon 1,2, polyphenylene sulfide, polyvinyl alcohol, polystyrene, polysulfone, liquid crystal polymers, polyethylene-vinyl acetate copolymer, polyacrylonitrile, polyvinylidene fluoride, and polyvinylidene fluoride-hexafluoropropylene. Examples of polyolefin resins include polyethylene and polypropylene. Examples of polyethylene include low-density polyethylene (LDPE), high-density polyethylene (HDPE), and linear low-density polyethylene (LLDPE). Examples of polypropylene include homopolymers of propylene and copolymerized polypropylene in which propylene and other monomers, ethylene, butene, and the like are polymerized. The fiber aggregate preferably contains one type of the above resins but may contain two or more types thereof.

When the first fiber layer and the second fiber layer are formed of a non-woven fabric formed by the electrospinning method, among the above examples, polyvinylidene fluoride, Nylon 6,6, polyacrylonitrile, polystyrene, polyurethane, polysulfone and polyvinyl alcohol are more preferable because they are soluble in various solvents in the electrospinning method. In addition, when the first fiber layer and the second fiber layer are formed of a melt blown non-woven fabric, among the above examples, polypropylene is preferable. The fiber layer preferably contains one type of the above resins but may contain two or more types thereof.

In addition, the fibers may contain various additives other than the resin. Examples of additives that can be added to the resin include a filler, a stabilizer, a plasticizer, an adhesive, an adhesion promoting agent (for example, a silane and a titanate), silica, glass, clay, talc, a pigment, a colorant, an antioxidant, a fluorescent brightening agent, an antibacterial agent, a surfactant, a flame retardant, and a fluoropolymer. One or more of the above additives may be used to reduce the weight and/or cost of the obtained fibers and layers, to adjust the viscosity or modify thermal characteristics of the fibers, or to impart various physical properties derived from characteristics of the additives, including electrical characteristics, optical characteristics, density characteristics, and liquid barrier or adhesiveness characteristics.

(Configuration of Each Layer: Substrate Layer)

The substrate layer in the laminated acoustic absorption member has a main role in the sound absorption property and also has a function of supporting the fiber layer and maintaining the shape of the entire acoustic absorption member. The laminated acoustic absorption member of the present invention has a form in which the substrate layer having a high porosity and a low density is interposed between the first fiber layer and the second fiber layer, and when an average flow pore diameter of the sound source side (incidence side) is controlled, sound can be introduced into the laminated acoustic absorption member, and when reflection is repeated inside the acoustic absorption member, sound can be absorbed. The substrate layer preferably has a characteristic that it has a high porosity and a low density, and also has a rigidity at which the fiber layer is supported and a certain interlayer distance can be maintained.

Specifically, preferably, the substrate layer has a porosity of 93% or more and less than 100% and a density of 0.008 to 0.05 g/cm$^3$. When the porosity is 93% or more, a flow resistance due to a density difference between the fiber layer and the substrate layer is controlled, and sound is repeatedly reflected inside the acoustic absorption member due to a density difference between the outer layer and the inner layer, and thus the sound inside the acoustic absorption member can be attenuated so that the sound absorption property is improved. In addition, when the porosity is less than 100%, it is possible to support the fiber layer and maintain a form of the laminated acoustic absorption member. In addition, when the density is 0.008 g/cm$^3$ or more, this is preferable for the acoustic absorption member because a rigidity at which the fiber layer is supported and a certain interlayer distance can be maintained is provided, and when the density is 0.05 g/cm$^3$ or less, this is preferable for the acoustic absorption member because it is possible to maintain the reduced weight.

The substrate layer may be composed of one substrate layer or may have a form in which a plurality of substrate layers are superimposed. The material constituting the substrate layer is not particularly limited as long as the fiber layer can be laminated on at least one surface, and a non-woven fabric, a glass fiber, paper, a woven fabric, a foam (foam layer), a mesh, and the like can be used. In particular, one or more of a non-woven fabric and a woven fabric is preferable, and a non-woven fabric is more preferable. The substrate included in the laminated acoustic absorption member may be of one type or of two or more types.

When the substrate layer is formed of a non-woven fabric, regarding the type of the non-woven fabric, a melt blown non-woven fabric, a spunlace non-woven fabric, a spunbond non-woven fabric, a through-air non-woven fabric, a thermal bond non-woven fabric, a needle punch non-woven fabric, and the like can be used, and the type can be appropriately selected depending on desired physical properties and functions.

Regarding the resin constituting the fibers of the non-woven fabric of the substrate layer, a thermoplastic resin can be used, and examples thereof include a polyolefin resin, a polyester resin such as polyethylene terephthalate, and a polyamide resin. Examples of polyolefin resins include homopolymers of ethylene, propylene, butene-1, or 4-methylpentene-1, and random or block copolymers of these and other α-olefins, that is, one or more of ethylene, propylene, butene-1, pentene-1, hexene-1 and 4-methylpentene-1, copolymers in which these are combined, and mixtures thereof. Examples of polyamide resins include Nylon 4, Nylon 6, Nylon 7, Nylon 1,1, Nylon 1,2, Nylon 6,6, Nylon 6,10, polymetaxylidene adipamide, polyparaxylidene decanamide, polybiscyclohexylmethane decanamide and copolyamides thereof. Examples of polyester resins include, in addition to polyethylene terephthalate, polytetramethylene terephthalate, polybutyl terephthalate, polyethylene oxybenzoate, poly(1,4-dimethylcyclohexane terephthalate) and copolymers thereof. Among these, in consideration of high versatility and heat fusion, one of polyethylene terephthalate, polybutylene terephthalate, polyethylene and polypropylene, or a combination of two or more thereof is preferably used.

The same resin can be used when the substrate layer is formed of a woven fabric or a mesh.

In addition, regarding the fibers constituting the non-woven fabric of the substrate layer, fibers composed of a single component can be used. However, in consideration of effects of fusion at the intersection of fibers, fibers composed of a composite component including a low melting point resin and a high melting point resin, that is, composite fibers including two or more components having different melting points, are preferably used. Examples of composite forms include a sheath-core type, an eccentric sheath-core type, and a parallel type. In addition, regarding fibers constituting the non-woven fabric of the substrate layer, mixed fibers in which two or more components having different melting points are mixed is preferably used. Here, the mixed fibers are fibers in which fibers made of a high melting point resin and fibers made of a low melting point resin exist independently and are mixed.

The average fiber diameter of the fibers constituting the non-woven fabric of the substrate layer is not particularly limited, but fibers having an average fiber diameter of 10 μm to 1 mm can be used. When the average fiber diameter is 10 μm or more, a flow resistance can be controlled due to a density difference between the fiber layer and the substrate layer, and when the average fiber diameter is 1 mm or less, the versatility is not lost and procurement becomes easy. The fiber diameter is more preferably 10 to 100 μm. The fiber diameter can be measured by the same method as in the measurement of the fiber diameter of the fiber layer.

The substrate layer is interposed between the first fiber layer and the second fiber layer. In addition, in addition to being interposed between the first fiber layer and the second fiber layer, the substrate layer may be included as a layer positioned on the outermost surface in the laminated acoustic absorption member. Regarding the substrate layer, a substrate layer may be composed of only one layer, or preferably, two or more layers are continuously disposed to form one substrate layer. When two or more substrate layers are continuously disposed, there is an advantage that an interlayer distance of the fiber layers can be controlled according to the thickness of the substrate layer.

The air permeability of the substrate layer is 40 cc/cm$^2$·s or more, preferably 40 to 250 cc/cm$^2$·s, and more preferably 40 to 150 cc/cm$^2$·s, in terms of the air permeability obtained by the Frazier method. In the related art, in the acoustic absorption member expected to have sound absorption performance and sound insulation performance, it is thought that, when the air permeability is lower, it is difficult for sound to pass through, that is, it is effective for sound insulation. On the other hand, it is thought that, in the laminated acoustic absorption member of the present invention, when the substrate layer has a high air permeability, reflection of sound is reduced, and when a layered configuration having an excellent sound absorption property is used, an improved sound absorption property is obtained.

In addition, the basis weight of the substrate layer is 1 to 700 g/m² and preferably 15 to 500 g/m². When the basis weight of the substrate layer is 1 g/m² or more, it is possible to obtain the strength required for the acoustic absorption member.

In the present invention, the substrate layer preferably has a thickness of 2.5 mm or more. The upper limit of the thickness of the substrate layer is not particularly limited, and in consideration of space saving, the range of the thickness is preferably 2.5 to 25 mm, and more preferably 3 to 20 mm.

In addition, the thickness of one material such as the non-woven fabric constituting the substrate layer can be, for example, 2.5 to 15 mm, and is more preferably 3 to 10 mm. When the thickness of each substrate is 2.5 mm or more, wrinkles do not occur, handling is easy, and the productivity is favorable. In addition, when the thickness of the substrate layer is 15 mm or less, there is no risk of hindering space saving.

Various additives, for example, a colorant, an antioxidant, a light stabilizer, a UV absorber, a neutralizer, a nucleating agent, a lubricant, an antibacterial agent, a flame retardant, a plasticizer and other thermoplastic resins may be added to the substrate layer as long as the effects of the present invention are not impaired. In addition, the surface may be treated with various finishing agents, and thus functions such as a water repellence property, an anti-static property, surface smoothness, and wear resistance may be imparted.

(Sound Absorption Property of Laminated Acoustic Absorption Member)

The laminated acoustic absorption member of the present invention has an excellent sound absorption property in a low-frequency range (frequency range of 1,000 Hz), an intermediate-frequency range (3,000 Hz), a high-frequency range (5,000 Hz), and an ultra-high-frequency range (10,000 Hz). Without being bound by a specific theory, it is thought that, when the laminated acoustic absorption member of the present invention has a configuration in which a low-density substrate layer is interposed between fiber layers having a controlled average flow pore diameter, an enclosed space interposed between the fiber layers is created, reflection repeatedly occurs in the enclosed space, and sound absorption efficiency becomes higher. In addition, it is thought that, when the fiber layer and the substrate layer having an average flow pore diameter in a specific range are used, sound is caused to pass through the first fiber layer while preventing reflection of the sound, and the sound is reflected at the second fiber layer, and thus can be more efficiently absorbed on the substrate layer so that an acoustic absorption member having a thin thickness and an improved sound absorption property is obtained.

A method of evaluating a sound absorption property will be described in detail with reference to examples.

(Method of Producing a Laminated Acoustic Absorption Member)

A method of producing a laminated acoustic absorption member is not particularly limited. For example, the member can be obtained according to a production method including a process including a fiber laminate in which one fiber layer is formed on one substrate layer (that is, a laminate of substrate layer/fiber layer) or a fiber laminate in which one fiber layer is formed on a protective layer (that is, a laminate of protective layer/fiber layer) is prepared and a process in which a plurality of fiber laminates are superimposed in a predetermined order and number of laminates to integrate them. When the fiber laminate is composed of a protective layer and fiber layers, the layers can be laminated and integrated so that the substrate layer is interposed between the fiber layer and the fiber layer. Here, in the process of superimposing fiber laminates, it is preferable to perform lamination by adding additional layers other than the fiber laminates, for example, additional substrate layers.

When a non-woven fabric is used as the substrate layer, a non-woven fabric may be produced using a known method and used, or a commercially available non-woven fabric can be selected and used. In a process of forming a fiber layer on the substrate layer or the protective layer, an electrospinning method or a melt blown method is preferably used.

The electrospinning method is a method in which a spinning solution is discharged, an electric field is applied, and the discharged spinning solution is formed into fibers, and the fibers are obtained on a collector. Examples thereof include a method in which a spinning solution is pushed out from a nozzle and an electric field is applied for spinning, a method in which a spinning solution is bubbled and an electric field is applied for spinning, and a method in which a spinning solution is guided on the surface of a cylindrical electrode and an electric field is applied for spinning. In the present invention, a non-woven fabric that becomes the substrate layer (or a protective layer) can be inserted on the collector, and the fibers can accumulate thereon. The spinning solution is not particularly limited as long as it has spinnability, and a solution in which a resin is dispersed in a solvent, a solution in which a resin is dissolved in a solvent, a solution in which a resin is melted by heating or laser irradiation, or the like can be used.

In order to improve spinning stability and a fiber forming property, the spinning solution may further contain a surfactant. Examples of surfactants include an anionic surfactant such as sodium dodecyl sulfate, a cationic surfactant such as tetrabutylammonium bromide, and a non-ionic surfactant such as polyoxyethylene sorbitan monolaurate. The concentration of the surfactant is preferably in a range of 5 weight % or less with respect to the spinning solution. When the concentration is 5 weight % or less, this is preferable because the commensurate effect in use is improved. In addition, as long as the effects of the present invention are not significantly impaired, components other than the above components may be contained as components of the spinning solution.

The melt blown method is a method in which a resin which will become a fiber layer and is in a molten state is pushed out from a nozzle onto the substrate layer and blown by heated compressed air to form a non-woven fabric. For example, a non-woven fabric can be produced using a non-woven fabric production device including two extruders including a screw, a heating component and a gear pump, a spinneret for mixed fibers, a compressed air generating device, and an air heating machine, a collection conveyor including a polyester net, and a winder. The basis weight can be arbitrarily set by adjusting the speed of the conveyor that conveys the substrate layer. The resin used for spinning is not particularly limited as long as it has thermoplasticity and spinnability.

A method of superimposing and integrating a plurality of fiber laminates obtained in the above is not particularly limited, and the fiber laminates may be simply superimposed without adhesion, and various adhesion methods, that is, thermocompression bonding using a heated flat roller and embossing roller, adhesion using a hot melt agent or a chemical adhesive, and thermal adhesion using circulating hot air or radiant heating can be used. In order to reduce deterioration of physical properties of the fiber layer, a heat treatment using circulating hot air or radiant heating is preferable among the above methods. In the case of thermocompression bonding using a flat roller and an embossing roller, the fiber layer may be melted and formed into a film or damaged such as breakage on a part near the embossing point, and stable production may be difficult, and additionally, performance deterioration such as deterioration of the sound absorption property easily occurs. In addition, in the case of adhesion using a hot melt agent or a chemical adhesive, voids between fibers of the fiber layer may be filled with the component, and performance deterioration may easily occur. On the other hand, when integration is performed by a heat treatment using circulating hot air or radiant heating, this is preferable because there is little damage to the fiber layer and it is possible to perform integration with sufficient peeling strength between layers. When integration is performed by a heat treatment using circulating hot air or radiant heating, a non-woven fabric or a laminate composed of heat-fusible composite fibers is preferably used without particular limitation.

EXAMPLES

Hereinafter, the present invention will be described in more detail with reference to examples, and the following examples are only for illustrative purposes. The scope of the present invention is not limited to the examples.

Methods of measuring values of physical properties and definitions shown in examples are shown below.
<Average Fiber Diameter>
A fiber structure (non-woven fabric) was observed using a scanning electron microscope SU8020 (commercially available from Hitachi High-Technologies Corporation), and the diameter of 50 fibers was measured using image analysis software. The average value of fiber diameters of 50 fibers was used as an average fiber diameter.
<Average flow pore diameter>
The average flow pore diameter was measured (JIS K 3832) using Capillary FlowPorometer (CFP-1200-A, commercially available from POROUS MATERIAL).
<Air Permeability>
(Frazier method): The air permeability was measured (JIS L 1096) using a woven fabric air permeability testing machine (Frazier method: A method, commercially available from Toyo Seiki Co., Ltd.).
(Gurley type method): The air permeability was measured (JIS L 1096) using GURLEY TYPE DENSOMETER (Gurley type method: B method, commercially available from Toyo Seiki Co., Ltd.).
<Measurement of Sound Absorption Coefficient>
For measurement a sound absorption coefficient, a sample having a diameter of 16.6 mm was taken from fiber laminates laminated under conditions, and a normal incidence sound absorption coefficient when a plane sound wave was vertically incident on a test piece at a frequency of 500 to 5,000 Hz was measured using normal incidence sound absorption coefficient measuring device "WinZacMTX (commercially available from Nihon Onkyo Engineering Co., Ltd.)" according to ASTM E 1050.
<Sound Absorption Property in the Low-Frequency Range>
When the curve obtained by measuring a sound absorption coefficient at a frequency of 900 Hz to 1,120 Hz at 56 points (3.9 Hz interval) was set as f(x), the average sound absorption coefficient ($\alpha$) was calculated by the following (Formula 1).

$$\alpha = \int_{900}^{1120} f(x)dx/56 \quad \text{(Formula 1)}$$

The average sound absorption coefficient ($\alpha$) indicates sound absorption performance in a frequency range of 900 to 1,120 Hz, and if the numerical value was high, it was determined that the sound absorption property was excellent. When $\alpha$ was 0.22 or more, the sound absorption property in the low-frequency range was evaluated as favorable, and when $\alpha$ was less than 0.22, the sound absorption property was evaluated as poor.
<Sound Absorption Property in the Intermediate-Frequency Range>
When the curve obtained by measuring a sound absorption coefficient at a frequency of 2,800 Hz to 3,550 Hz at 190 points (3.9 Hz interval) was set as f(x), the average sound absorption coefficient ($\beta$) was calculated by the following (Formula 2).

The average sound absorption coefficient ($\beta$) indicates sound absorption performance in a frequency range of 2,800 to 3,550 Hz, and if the numerical value was high, it was determined that the sound absorption property was excellent. When $\beta$ was 0.60 or more, the sound absorption property in the intermediate-frequency range was evaluated as favorable, and when $\beta$ was less than 0.60, the sound absorption property was evaluated as poor.

$$\beta = \int_{2800}^{3550} f(x)dx/190 \quad \text{(Formula 2)}$$

<Sound Absorption Property in the High-Frequency Range>
When the curve obtained by measuring a sound absorption coefficient at a frequency of 4,500 Hz to 5,600 Hz at 282 points (3.9 Hz interval) was set as f(x), the average sound absorption coefficient ($\gamma$) was calculated by the following (Formula 3).

The average sound absorption coefficient ($\gamma$) indicates sound absorption performance in a frequency range of 4,500 to 5,600 Hz, and if the numerical value was high, it was determined that the sound absorption property was excellent. When $\gamma$ was 0.90 or more, the sound absorption property in the high-frequency range was evaluated as favorable, and when $\gamma$ was less than 0.90, the sound absorption property was evaluated as poor.

$$\gamma = \int_{4500}^{5600} f(x)dx/282 \quad \text{(Formula 3)}$$

<Sound Absorption Property in the Ultra-High-Frequency Range>
When the curve obtained by measuring a sound absorption coefficient at a frequency of 9,000 Hz to 11,200 Hz at 564 points (3.9 Hz interval) was set as f(x), the average sound absorption coefficient ($\eta$) was calculated by the following (Formula 4).

The average sound absorption coefficient ($\eta$) indicates sound absorption performance in a frequency range of 9,000 to 11,200 Hz, and if the numerical value was high, it was determined that the sound absorption property was excellent. When $\eta$ was 0.85 or more, the sound absorption property in the high-frequency range was evaluated as favorable, and when $\eta$ was less than 0.85, the sound absorption property was evaluated as poor.

$$\eta = \int_{9000}^{11200} f(x)dx/564 \quad \text{(Formula 4)}$$

<Preparation of Substrate Layer>
A high-density polyethylene "M6900" (MFR 17 g/10 minutes, commercially available from Keiyo Polyethylene) was used as a high-density polyethylene, a polypropylene homopolymer "SA3A" (MFR=11 g/10 minutes, commercially available from Japan Polypropylene Corporation) was used as a polypropylene, and a sheath-core type heat-fusible composite fiber including a sheath component having a fiber diameter of 16 μm and formed of a high-density polyethylene and a core component formed of polypropylene was produced according to a hot melt spinning method. A card method through-air non-woven fabric with a basis weight of 200 g/m², a thickness of 5 mm, a width of 1,000 mm was produced using the obtained sheath-core type heat-fusible composite fiber. The card method through-air non-woven fabric was crushed to a size of about 6 mm using a uniaxial crusher (ES3280, commercially available from Syoken Co., Ltd.).

The crushed non-woven fabric was heated in an air laid testing machine at a set temperature of 142° C., and a substrate layer P having a basis weight of 250 g/m², an air permeability of 95 cc/cm²·s, and a thickness of 5 mm, a substrate layer M having a basis weight of 373 g/m², an air permeability of 70 cc/cm²·s, and a thickness of 5 mm, a substrate layer Q having a basis weight of 500 g/m², an air permeability of 78 cc/cm²·s, and a thickness of 10 mm, and a substrate layer N having a basis weight of 423 g/m², an air permeability of 83 cc/cm²·s, and a thickness of 10 mm were obtained.

<Preparation of Protective Layer>

Regarding the protective layer, a commercially available card method through-air non-woven fabric (basis weight of 18 g/m², a thickness of 60 μm) made of polyethylene terephthalate was prepared.

<Preparation of Fiber Layer>

•Fiber Layer A

A polyurethane (grade name: T1190, commercially available from DIC Bayer Polymer Ltd.) was dissolved in a cosolvent (60/40 (w/w)) of N,N-dimethylformamide and acetone at a concentration of 15 mass % to prepare an electrospinning solution. A protective layer was prepared, and a polyurethane solution was electrospun thereon to produce a fiber laminate composed of two layers: the protective layer and polyurethane microfibers. In electrospinning conditions, a 27 G needle was used, the amount of a single hole solution supplied was 2.5 mL/h, the applied voltage was 47 kV, and the spinning distance was 20 cm.

Regarding the polyurethane microfibers in the fiber laminate, the basis weight of the layer was 0.5 g/m², the average fiber diameter was 470 nm, and the melting temperature was 175° C. The resulting fibers were used for a fiber layer A. The average flow pore diameter was evaluated as 8.9 μm.

•Fiber Layer B

Kynar (product name) 3120 which is polyvinylidene fluoride-hexafluoropropylene (hereinafter abbreviated as "PVDF-HFP," commercially available from Arkema) was dissolved in a cosolvent (60/40 (w/w)) of N,N-dimethylacetamide and acetone at a concentration of 15 mass % to prepare an electrospinning solution and 0.01 mass % of a conductive agent was added. A protective layer was prepared, and the PVDF-HFP solution was electrospun thereon to produce a fiber laminate composed of two layers: the protective layer and PVDF-HFP microfibers. In electrospinning conditions, a 24 G needle was used, the amount of a single hole solution supplied was 3.0 mL/h, the applied voltage was 35 kV, and the spinning distance was 17.5 cm.

Regarding the PVDF-HFP microfibers in the fiber laminate, the basis weight of the layer was 3.0 g/m², the average fiber diameter was 80 nm, and the melting temperature was 168° C. The resulting fibers were used for a fiber layer B. The average flow pore diameter was evaluated as 0.7 μm.

•Fiber Layer C

Kynar (product name) 3120 which is polyvinylidene fluoride-hexafluoropropylene (hereinafter abbreviated as "PVDF-HFP," commercially available from Arkema) was dissolved in a cosolvent (60/40 (w/w)) of N,N-dimethylacetamide and acetone at a concentration of 15 mass % to prepare an electrospinning solution.

A protective layer was prepared, and the PVDF-HFP solution was electrospun thereon to produce a fiber laminate composed of two layers: the protective layer and PVDF-HFP microfibers. In electrospinning conditions, a 24 G needle was used, the amount of a single hole solution supplied was 3.0 mL/h, the applied voltage was 35 kV, and the spinning distance was 17.5 cm. Regarding the PVDF-HFP microfibers in the fiber laminate, the basis weight of the layer was 1 g/m², and the average fiber diameter was 200 nm. The resulting fibers were used for a fiber layer C. The average flow pore diameter was evaluated as 2.4 μm.

•Fiber Layer D

Kynar (product name) 3120 which is polyvinylidene fluoride-hexafluoropropylene (hereinafter abbreviated as "PVDF-HFP," commercially available from Arkema) was dissolved in a cosolvent (60/40 (w/w)) of N,N-dimethylacetamide and acetone at a concentration of 20 mass % to prepare an electrospinning solution.

A protective layer was prepared, and the PVDF-HFP solution was electrospun thereon to produce a fiber laminate composed of two layers: the protective layer and PVDF-HFP microfibers. In electrospinning conditions, a 24 G needle was used, the amount of a single hole solution supplied was 3.0 mL/h, the applied voltage was 35 kV, and the spinning distance was 17.5 cm. Regarding the PVDF-HFP microfibers in the fiber laminate, the basis weight of the layer was 2 g/m², and the average fiber diameter was 400 nm. The resulting fibers were used for a fiber layer D. The average flow pore diameter was evaluated as 2.2 μm.

•Fiber Layer E

Kynar (product name) 3120 which is polyvinylidene fluoride-hexafluoropropylene (hereinafter abbreviated as "PVDF-HFP," commercially available from Arkema) was dissolved in a cosolvent (60/40 (w/w)) of N,N-dimethylacetamide and acetone at a concentration of 15 mass % to prepare an electrospinning solution.

A protective layer was prepared, and the PVDF-HFP solution was electrospun thereon to produce a fiber laminate composed of two layers: the protective layer and PVDF-HFP microfibers. In electrospinning conditions, a 24 G needle was used, the amount of a single hole solution supplied was 3.0 mL/h, the applied voltage was 35 kV, and the spinning distance was 17.5 cm. Regarding the PVDF-HFP microfibers in the fiber laminate, the basis weight of the layer was 2.2 g/m², and the average fiber diameter was 200 nm. The resulting fibers were used for a fiber layer E. The average flow pore diameter was evaluated as 1.5 μm.

•Fiber Layer F

A polyurethane (grade name: T1190, commercially available from DIC Bayer Polymer Ltd.) was dissolved in a cosolvent (60/40 (w/w)) of N,N-dimethylformamide and acetone at a concentration of 12.5 mass % to prepare an electrospinning solution. A protective layer was prepared, and a polyurethane solution was electrospun thereon to produce a fiber laminate composed of two layers: the protective layer and polyurethane microfibers. In electrospinning conditions, a 27 G needle was used, the amount of a single hole solution supplied was 2.0 mL/h, the applied voltage was 47 kV, and the spinning distance was 20 cm.

Regarding the polyurethane microfibers in the fiber laminate, the basis weight of the layer was 0.5 g/m², and the average fiber diameter was 260 nm. The resulting fibers were used for a fiber layer F. The average flow pore diameter was evaluated as 2.8 μm.

•Fiber Layer G

A polyurethane (grade name: T1190, commercially available from DIC Bayer Polymer Ltd.) was dissolved in a cosolvent (60/40 (w/w)) of N,N-dimethylformamide and acetone at a concentration of 12.5 mass % to prepare an electrospinning solution. A protective layer was prepared, and a polyurethane solution was electrospun thereon to produce a fiber laminate composed of two layers: the protective layer and polyurethane microfibers. In electrospinning conditions, a 27 G needle was used, the amount of a single hole solution supplied was 2.0 mL/h, the applied voltage was 47 kV, and the spinning distance was 20 cm.

Regarding the polyurethane microfibers in the fiber laminate, the basis weight of the layer was 3 g/m$^2$, and the average fiber diameter was 270 nm. The resulting fibers were used for a fiber layer G. The average flow pore diameter was evaluated as 0.9 μm.

•Fiber Layer H

A polyurethane (grade name: T1190, commercially available from DIC Bayer Polymer Ltd.) was dissolved in a cosolvent (60/40 (w/w)) of N,N-dimethylformamide and acetone at a concentration of 10 mass % to prepare an electrospinning solution. A protective layer was prepared, and a polyurethane solution was electrospun thereon to produce a fiber laminate composed of two layers: the protective layer and polyurethane microfibers. In electrospinning conditions, a 27 G needle was used, the amount of a single hole solution supplied was 2.0 mL/h, the applied voltage was 45 kV, and the spinning distance was 20 cm.

Regarding the polyurethane microfibers in the fiber laminate, the basis weight of the layer was 3 g/m$^2$, and the average fiber diameter was 90 nm. The resulting fibers were used for a fiber layer H. The average flow pore diameter was evaluated as 0.8 μm.

•Fiber Layer I

A polyurethane (grade name: T1190, commercially available from DIC Bayer Polymer Ltd.) was dissolved in a cosolvent (60/40 (w/w)) of N,N-dimethylformamide and acetone at a concentration of 12.5 mass % to prepare an electrospinning solution. A protective layer was prepared, and a polyurethane solution was electrospun thereon to produce a fiber laminate composed of two layers: the protective layer and polyurethane microfibers. In electrospinning conditions, a 27 G needle was used, the amount of a single hole solution supplied was 2.0 mL/h, the applied voltage was 47 kV, and the spinning distance was 20 cm.

Regarding the polyurethane microfibers in the fiber laminate, the basis weight of the layer was 2 g/m$^2$, and the average fiber diameter was 270 nm. The resulting fibers were used for a fiber layer I. The average flow pore diameter was evaluated as 1.0 μm.

•Fiber Layer J

In order to form a fiber layer, a non-woven fabric production device including two extruders including a screw (a diameter of 50 mm), a heating component and a gear pump, a spinneret for mixed fibers (a pore diameter of 0.3 mm, 501 holes through which a resin is alternately discharged from two extruders are arranged in a row, an effective width of 500 mm), a compressed air generating device and an air heating machine, a collection conveyor including a polyester net, and a winder.

Regarding a raw material polypropylene, a polypropylene homopolymer 1 (MFR=82 g/10 minutes) and a polypropylene homopolymer 2 ("FR-185" (MFR=1,400 g/10 minutes) commercially available from LOTTE CHEMICAL) were used, two types of polypropylene were put into the two extruders of the non-woven fabric production device, the extruders were melted by heating at 240° C., the mass ratio of the gear pump was set to 50/50, and the molten resin was discharged from the spinneret at a spinning speed of 0.3 g/min per single hole. The discharged fibers were blown from the spinneret with compressed air with a gauge pressure of 98 kPa heated to 400° C. onto the collection conveyor at a distance of 60 cm to form a fiber layer. The basis weight was set to 80 g/m$^2$ by adjusting the speed of the collection conveyor. The average fiber diameter was 1.3 μm, and the resulting fibers were used for a fiber layer J. The average flow pore diameter was evaluated as 9.4 μm.

•Fiber Layer L

In order to form a fiber layer, a non-woven fabric production device including two extruders including a screw (a diameter of 50 mm), a heating component and a gear pump, a spinneret for mixed fibers (a pore diameter of 0.3 mm, 501 holes through which a resin is alternately discharged from two extruders are arranged in a row, an effective width of 500 mm), a compressed air generating device and an air heating machine, a collection conveyor including a polyester net, and a winder.

Regarding a raw material polypropylene, a polypropylene homopolymer 1 (MFR=82 g/10 minutes) and a polypropylene homopolymer 2 ("FR-185" (MFR=1,400 g/10 minutes) commercially available from LOTTE CHEMICAL) were used, two types of polypropylene were put into the two extruders of the non-woven fabric production device, the extruders were melted by heating at 240° C., the mass ratio of the gear pump was set to 50/50, and the molten resin was discharged from the spinneret at a spinning speed of 0.3 g/min per single hole. The discharged fibers were blown from the spinneret with compressed air with a gauge pressure of 63 kPa heated to 400° C. onto the collection conveyor at a distance of 60 cm to form a fiber layer. The basis weight was set to 80 g/m$^2$ by adjusting the speed of the collection conveyor. The average fiber diameter was 1.9 μm, and the resulting fibers were used for a fiber layer L. The average flow pore diameter was evaluated as 12.6 μm.

Example 1

A substrate layer M was interposed between a first fiber layer (fiber layer A) and a second fiber layer (fiber layer B), and they were superimposed in order of the first fiber layer/the substrate layer M/the second fiber layer so that the outermost layer became the protective layer. The obtained sample was used as a sound absorption coefficient measurement sample. Since there were two fiber layers, the number of fiber layers was "2." This was punched out into a circle having a diameter of 16.6 mm to obtain a sound absorption coefficient measurement sample.

When sound was input from the side of the first fiber layer of the obtained sample, the normal incidence sound absorption coefficient was measured, the sound absorption coefficient from 900 Hz to 1,120 Hz was measured as the sound absorption property in the low-frequency range, and the average sound absorption coefficient (α) was evaluated, the result was favorable at 0.42. When the normal incidence sound absorption coefficient was measured, the average sound absorption coefficient (β) from 2,800 Hz to 3,550 Hz was evaluated as the sound absorption property in the intermediate-frequency range, the result was favorable at 0.98. When the average sound absorption coefficient (γ) from 4,500 Hz to 5,600 Hz was evaluated as the sound absorption property in the high-frequency range, the result was favorable at 0.98. When the average sound absorption coefficient (η) from 9,000 Hz to 11,200 Hz was evaluated as the sound absorption property in the ultra-high-frequency range, the result was favorable at 0.97.

Here, during measurement, a 5 mm air layer was provided behind the measurement sample for measurement (excluding Comparative Examples 3 and 4).

Example 2

A substrate layer M was interposed between a first fiber layer (fiber layer C) and a second fiber layer (fiber layer B), and they were superimposed in order of the first fiber layer C/the substrate layer M/the second fiber layer B, and thereby a sound absorption coefficient measurement sample was obtained in the same manner as in Example 1.

When sound was input from the side of the first fiber layer of the obtained sample, the normal incidence sound absorption coefficient was measured, the sound absorption coefficient from 900 Hz to 1,120 Hz was measured as the sound absorption property in the low-frequency range, and the average sound absorption coefficient ($\alpha$) was evaluated, the result was favorable at 0.27. When the normal incidence sound absorption coefficient was measured, the average sound absorption coefficient ($\beta$) from 2,800 Hz to 3,550 Hz was evaluated as the sound absorption property in the intermediate-frequency range, the result was favorable at 0.96. When the average sound absorption coefficient ($\gamma$) from 4,500 Hz to 5,600 Hz was evaluated as the sound absorption property in the high-frequency range, the result was favorable at 0.98. When the average sound absorption coefficient ($\eta$) from 9,000 Hz to 11,200 Hz was evaluated as the sound absorption property in the ultra-high-frequency range, the result was favorable at 0.96.

Example 3

A substrate layer M was interposed between a first fiber layer (fiber layer D) and a second fiber layer (fiber layer B), and they were superimposed in order of the first fiber layer D/the substrate layer M/the second fiber layer B, and thereby a sound absorption coefficient measurement sample was obtained in the same manner as in Example 1.

When sound was input from the side of the first fiber layer of the obtained sample, the normal incidence sound absorption coefficient was measured, the sound absorption coefficient from 900 Hz to 1,120 Hz was measured as the sound absorption property in the low-frequency range, and the average sound absorption coefficient ($\alpha$) was evaluated, the result was favorable at 0.35. When the normal incidence sound absorption coefficient was measured, the average sound absorption coefficient ($\beta$) from 2,800 Hz to 3,550 Hz was evaluated as the sound absorption property in the intermediate-frequency range, the result was favorable at 0.97. When the average sound absorption coefficient ($\gamma$) from 4,500 Hz to 5,600 Hz was evaluated as the sound absorption property in the high-frequency range, the result was favorable at 0.94. When the average sound absorption coefficient ($\eta$) from 9,000 Hz to 11,200 Hz was evaluated as the sound absorption property in the ultra-high-frequency range, the result was favorable as 0.92.

Example 4

A substrate layer M was interposed between a first fiber layer (fiber layer E) and a second fiber layer (fiber layer B), and they were superimposed in order of the first fiber layer E/the substrate layer M/the second fiber layer B, and thereby a sound absorption coefficient measurement sample was obtained in the same manner as in Example 1.

When sound was input from the side of the first fiber layer of the obtained sample, the normal incidence sound absorption coefficient was measured, the sound absorption coefficient from 900 Hz to 1,120 Hz was measured as the sound absorption property in the low-frequency range, and the average sound absorption coefficient ($\alpha$) was evaluated, the result was favorable at 0.36. When the normal incidence sound absorption coefficient was measured, the average sound absorption coefficient ($\beta$) from 2,800 Hz to 3,550 Hz was evaluated as the sound absorption property in the intermediate-frequency range, the result was favorable at 0.98. When the average sound absorption coefficient ($\gamma$) from 4,500 Hz to 5,600 Hz was evaluated as the sound absorption property in the high-frequency range, the result was favorable at 0.94. When the average sound absorption coefficient ($\eta$) from 9,000 Hz to 11,200 Hz was evaluated as the sound absorption property in the ultra-high-frequency range, the result was favorable at 0.89.

Example 5

A substrate layer M was interposed between a first fiber layer (fiber layer E) and a second fiber layer (fiber layer E), and they were superimposed in order of the first fiber layer E/the substrate layer M/the second fiber layer E, and thereby a sound absorption coefficient measurement sample was obtained in the same manner as in Example 1.

When sound was input from the side of the first fiber layer of the obtained sample, the normal incidence sound absorption coefficient was measured, the sound absorption coefficient from 900 Hz to 1,120 Hz was measured as the sound absorption property in the low-frequency range, and the average sound absorption coefficient ($\alpha$) was evaluated, the result was favorable at 0.35. When the normal incidence sound absorption coefficient was measured, the average sound absorption coefficient ($\beta$) from 2,800 Hz to 3,550 Hz was evaluated as the sound absorption property in the intermediate-frequency range, the result was favorable at 0.98. When the average sound absorption coefficient ($\gamma$) from 4,500 Hz to 5,600 Hz was evaluated as the sound absorption property in the high-frequency range, the result was favorable at 0.93. When the average sound absorption coefficient ($\eta$) from 9,000 Hz to 11,200 Hz was evaluated as the sound absorption property in the ultra-high-frequency range, the result was favorable at 0.94.

Example 6

A substrate layer M was interposed between a first fiber layer (fiber layer C) and a second fiber layer (fiber layer C), and they were superimposed in order of the first fiber layer C/the substrate layer M/the second fiber layer C, and thereby a sound absorption coefficient measurement sample was obtained in the same manner as in Example 1.

When sound was input from the side of the first fiber layer of the obtained sample, the normal incidence sound absorption coefficient was measured, the sound absorption coefficient from 900 Hz to 1,120 Hz was measured as the sound absorption property in the low-frequency range, and the average sound absorption coefficient ($\alpha$) was evaluated, the result was favorable at 0.29. When the normal incidence sound absorption coefficient was measured, the average sound absorption coefficient ($\beta$) from 2,800 Hz to 3,550 Hz was evaluated as the sound absorption property in the intermediate-frequency range, the result was favorable at 0.95. When the average sound absorption coefficient (γ) from 4,500 Hz to 5,600 Hz was evaluated as the sound absorption property in the high-frequency range, the result was favorable at 0.98. When the average sound absorption coefficient (η) from 9,000 Hz to 11,200 Hz was evaluated as the sound absorption property in the ultra-high-frequency range, the result was favorable at 0.89.

Table 1 shows a summary of configurations and sound absorption properties of the laminated acoustic absorption members of Examples 1 to 6. In addition, configurations of respective layers are shown together.

TABLE 1

| | | Example 1 | Example 2 | Example 3 | Example 4 | Example 5 | Example 6 |
|---|---|---|---|---|---|---|---|
| First fiber layer | Type | A | C | D | E | E | C |
| | Basis weight (g/m$^2$) | 0.5 | 1.0 | 2.0 | 2.2 | 2.2 | 1.0 |
| | Average flow pore diameter (μm) | 8.9 | 2.4 | 2.2 | 1.5 | 1.5 | 2.4 |
| | Density (g/cm$^3$) | 0.14 | 0.18 | 0.17 | 0.17 | 0.17 | 0.18 |
| | Porosity (%) | 90 | 90 | 90 | 90 | 90 | 90 |
| | Air permeability (μm/Pa · s) obtained by Gurley type method | >1,000 | 1,000 | 900 | 430 | 430 | 1,000 |
| Substrate layer | Type | M | M | M | M | M | M |
| | Basis weight (g/m$^2$) | 373 | 373 | 373 | 373 | 373 | 373 |
| | Density (g/cm$^3$) | 0.06 | 0.06 | 0.06 | 0.06 | 0.06 | 0.06 |
| | Porosity (%) | 94 | 94 | 94 | 94 | 94 | 94 |
| | Air permeability (cc/cm$^2$ · s) obtained by Frazier method | 70 | 70 | 70 | 70 | 70 | 70 |
| | Air permeability (μm/Pa · s) by Gurley type method | >1,000 | >1,000 | >1,000 | >1,000 | >1,000 | >1,000 |
| Second fiber layer | Type | B | B | B | B | E | C |
| | Basis weight (g/m$^2$) | 3.0 | 3.0 | 3.0 | 3.0 | 2.2 | 1.0 |
| | Average flow pore diameter (μm) | 0.7 | 0.7 | 0.7 | 0.7 | 1.5 | 2.4 |
| | Density | 0.22 | 0.22 | 0.22 | 0.22 | 0.17 | 0.18 |
| | Porosity (%) | 88 | 88 | 88 | 88 | 90 | 90 |
| | Air permeability (μm/Pa · s) obtained by Gurley type method | 60 | 60 | 60 | 60 | 430 | 1,000 |
| Normal incidence sound absorption coefficient | Average sound absorption coefficient (α) in low-frequency range | 0.42 | 0.27 | 0.35 | 0.36 | 0.35 | 0.29 |
| | Average sound absorption coefficient (β) in intermediate-frequency range | 0.98 | 0.96 | 0.97 | 0.98 | 0.98 | 0.95 |
| | Average sound absorption coefficient (γ) in high-frequency range | 0.98 | 0.98 | 0.94 | 0.94 | 0.93 | 0.98 |
| | Average sound absorption coefficient (η) in ultra-high-frequency range | 0.97 | 0.96 | 0.92 | 0.89 | 0.94 | 0.89 |

In Examples 7 to 21, as in the above examples, the laminated acoustic absorption members were produced using various fiber layers and substrate layers, and the normal incidence sound absorption coefficient was measured. Table 2 shows a summary of configurations and sound absorption coefficients of the laminated acoustic absorption members. In addition, configurations of respective layers are shown together.

TABLE 2

| | | Example 7 | Example 8 | Example 9 | Example 10 | Example 11 | Example 12 | Example 13 | Example 14 |
|---|---|---|---|---|---|---|---|---|---|
| First fiber layer | Type | A | C | D | E | C | A | C | E |
| | Basis weight (g/m$^2$) | 0.5 | 1.0 | 2.0 | 2.2 | 1.0 | 0.5 | 1.0 | 2.2 |
| | Average flow pore diameter (μm) | 8.9 | 2.4 | 2.2 | 1.5 | 2.4 | 8.9 | 2.4 | 1.5 |
| | Density (g/cm$^3$) | 0.14 | 0.18 | 0.17 | 0.17 | 0.18 | 0.14 | 0.18 | 0.17 |
| | Porosity (%) | 90 | 90 | 90 | 90 | 90 | 90 | 90 | 90 |
| | Air permeability (μm/Pa · s) obtained by Gurley type method | >1,000 | 1,000 | 900 | 430 | 1,000 | >1,000 | 1,000 | 430 |

TABLE 2-continued

| Substrate layer | Type | N | N | N | N | N | N | N | N |
|---|---|---|---|---|---|---|---|---|---|
| | Basis weight (g/m²) | 423 | 423 | 423 | 423 | 423 | 423 | 423 | 423 |
| | Density (g/cm³) | 0.04 | 0.04 | 0.04 | 0.04 | 0.04 | 0.04 | 0.04 | 0.04 |
| | Porosity (%) | 96 | 96 | 96 | 96 | 96 | 96 | 96 | 96 |
| | Air permeability (cc/cm² · s) obtained by Frazier method | 83 | 83 | 83 | 83 | 83 | 83 | 83 | 83 |
| | Air permeability (μm/Pa · s) obtained by Gurley type method | >1,000 | >1,000 | >1,000 | >1,000 | >1,000 | >1,000 | >1,000 | >1,000 |
| Second fiber layer | Type | B | B | B | B | C | E | E | E |
| | Basis weight (g/m²) | 3.0 | 3.0 | 3.0 | 3.0 | 1.0 | 2.2 | 2.2 | 2.2 |
| | Average flow pore diameter (μm) | 0.7 | 0.7 | 0.7 | 0.7 | 2.4 | 1.5 | 1.5 | 1.5 |
| | Density (g/cm³) | 0.22 | 0.22 | 0.22 | 0.22 | 0.18 | 0.17 | 0.17 | 0.17 |
| | Porosity (%) | 88 | 88 | 88 | 88 | 90 | 90 | 90 | 90 |
| | Air permeability (μm/Pa · s) obtained by Gurley type method | 60 | 60 | 60 | 60 | 1,000 | 430 | 430 | 430 |
| Normal incidence sound absorption coefficient | Average sound absorption coefficient (α) in low-frequency range | 0.44 | 0.50 | 0.42 | 0.36 | 0.53 | 0.44 | 0.39 | 0.40 |
| | Average sound absorption coefficient (β) in intermediate-frequency range | 0.98 | 0.99 | 0.98 | 0.99 | 0.99 | 0.99 | 0.98 | 1.00 |
| | Average sound absorption coefficient (γ) in high-frequency range | 0.98 | 0.99 | 0.98 | 0.99 | 0.92 | 0.99 | 0.99 | 0.98 |
| | Average sound absorption coefficient (η) in ultra-high-frequency range | 0.97 | 0.86 | 0.85 | 0.95 | 0.86 | 0.97 | 0.98 | 0.96 |

| | | Example 15 | Example 16 | Example 17 | Example 18 | Example 19 | Example 20 | Example 21 |
|---|---|---|---|---|---|---|---|---|
| First fiber layer | Type | F | F | F | F | F | J | J |
| | Basis weight (g/m²) | 0.5 | 0.5 | 0.5 | 0.5 | 0.5 | 80 | 80 |
| | Average flow pore diameter (μm) | 2.8 | 2.8 | 2.8 | 2.8 | 2.8 | 9.4 | 9.4 |
| | Density (g/cm³) | 0.15 | 0.15 | 0.15 | 0.15 | 0.15 | 0.04 | 0.04 |
| | Porosity (%) | 90 | 90 | 90 | 90 | 90 | 96 | 96 |
| | Air permeability (μm/Pa · s) obtained by Gurley type method | 830 | 830 | 830 | 830 | 830 | >1,000 | >1,000 |
| Substrate layer | Type | P | P | Q | Q | Q | P | Q |
| | Basis weight (g/m²) | 250 | 250 | 500 | 500 | 500 | 250 | 500 |
| | Density (g/cm³) | 0.05 | 0.05 | 0.05 | 0.05 | 0.05 | 0.05 | 0.05 |
| | Porosity (%) | 96 | 96 | 96 | 96 | 96 | 96 | 96 |
| | Air permeability (cc/cm² · s) obtained by Frazier method | 95 | 95 | 78 | 78 | 78 | 95 | 78 |
| | Air permeability (μm/Pa · s) by Gurley type method | >1,000 | >1,000 | >1,000 | >1,000 | >1,000 | >1,000 | >1,000 |
| Second fiber layer | Type | G | H | F | I | H | B | B |
| | Basis weight (g/m²) | 3.0 | 3.0 | 0.5 | 2.0 | 3.0 | 3.0 | 3.0 |
| | Average flow pore diameter (μm) | 0.9 | 0.8 | 2.8 | 1.0 | 0.8 | 0.7 | 0.7 |
| | Density (g/cm³) | 0.15 | 0.15 | 0.15 | 0.15 | 0.15 | 0.22 | 0.22 |
| | Porosity (%) | 90 | 88 | 90 | 90 | 88 | 88 | 88 |
| | Air permeability (μm/Pa · s) obtained by Gurley type method | 170 | 80 | 830 | 300 | 80 | 60 | 60 |
| Normal incidence sound absorption coefficient | Average sound absorption coefficient (α) in low-frequency range | 0.22 | 0.24 | 0.40 | 0.36 | 0.33 | 0.28 | 0.45 |
| | Average sound absorption coefficient (β) in intermediate-frequency range | 0.86 | 0.94 | 0.96 | 0.95 | 0.96 | 0.97 | 0.99 |
| | Average sound absorption coefficient (γ) in high-frequency range | 0.96 | 0.99 | 0.99 | 0.99 | 0.99 | 0.90 | 0.94 |
| | Average sound absorption coefficient (η) in ultra-high-frequency range | 0.93 | 0.95 | 0.94 | 0.98 | 0.98 | 0.85 | 0.86 |

[Comparative Example 1] (Reverse Arrangement of Example 2)

When sound was input from the side of the second fiber layer of the sample obtained in Example 2, he normal incidence sound absorption coefficient was measured, the sound absorption coefficient from 900 Hz to 1,120 Hz was measured as the sound absorption property in the low-frequency range, and the average sound absorption coefficient (α) was evaluated, the result was favorable at 0.39.

When the normal incidence sound absorption coefficient was measured, the average sound absorption coefficient (β) from 2,800 Hz to 3,550 Hz was evaluated as the sound absorption property in the intermediate-frequency range, the result was favorable at 0.97. When the average sound absorption coefficient (γ) from 4,500 Hz to 5,600 Hz was evaluated as the sound absorption property in the high-frequency range, the result was favorable at 0.90. When the average sound absorption coefficient (η) from 9,000 Hz to 11,200 Hz was evaluated as the sound absorption property in the ultra-high-frequency range, the result was poor at 0.73.

It was thought that, when the pore diameter became smaller, reflection of sound in the ultra-high-frequency range had a strong effect and the sound absorption property deteriorated.

[Comparative Example 2] (Only Substrate Layer (Substrate Layer M))

Using the air laid testing machine, the prepared substrate layer M having a basis weight of 373 g/m² and a thickness of 5 mm was punched out into a circle having a diameter of 16.6 mm to obtain a sound absorption coefficient measurement sample. When the normal incidence sound absorption coefficient of this sample was measured, the sound absorption coefficient from 900 Hz to 1,120 Hz was measured as the sound absorption property in the low-frequency range, and the average sound absorption coefficient (α) was evaluated, the result was poor at 0.11. When the normal incidence sound absorption coefficient was measured, the average sound absorption coefficient (β) from 2,800 Hz to 3,550 Hz was evaluated as the sound absorption property in the intermediate-frequency range, the result was poor at 0.28. When the average sound absorption coefficient (γ) from 4,500 Hz to 5,600 Hz was evaluated as the sound absorption property in the high-frequency range, the result was poor at 0.41. When the average sound absorption coefficient (η) from 9,000 Hz to 11,200 Hz was evaluated as the sound absorption property in the ultra-high-frequency range, the result was poor at 0.80.

[Comparative Example 3] (Commercially Available Polypropylene Non-Woven Fabric)

A commercially available polypropylene non-woven fabric (Thinsulate TAI1590 commercially available from 3M, a fiber diameter of 0.7 to 4.0 μm, a thickness of 13 mm) was punched out into a circle having a diameter of 16.6 mm to obtain a sound absorption coefficient measurement sample. When the normal incidence sound absorption coefficient of this sample was measured, the sound absorption coefficient from 900 Hz to 1,120 Hz was measured as the sound absorption property in the low-frequency range, and the average sound absorption coefficient (α) was evaluated, the result was poor at 0.12. When the normal incidence sound absorption coefficient was measured, the average sound absorption coefficient (β) from 2,800 Hz to 3,550 Hz was evaluated as the sound absorption property in the intermediate-frequency range, the result was poor at 0.47. When the average sound absorption coefficient (γ) from 4,500 Hz to 5,600 Hz was evaluated as the sound absorption property in the high-frequency range, the result was poor at 0.69. When the average sound absorption coefficient (η) from 9,000 Hz to 11,200 Hz was evaluated as the sound absorption property in the ultra-high-frequency range, the result was favorable at 0.88.

[Comparative Example 4] (Commercially Available Polypropylene Non-Woven Fabric)

A commercially available polypropylene non-woven fabric (Thinsulate TC3303 commercially available from 3M, a fiber diameter of 0.7 to 4.0 μm, a thickness of 41 mm) was punched out into a circle having a diameter of 16.6 mm to obtain a sound absorption coefficient measurement sample. When the normal incidence sound absorption coefficient of this sample was measured, the sound absorption coefficient from 900 Hz to 1,120 Hz was measured as the sound absorption property in the low-frequency range, and the average sound absorption coefficient (α) was evaluated, the result was poor at 0.21. When the normal incidence sound absorption coefficient was measured, the average sound absorption coefficient (β) from 2,800 Hz to 3,550 Hz was evaluated as the sound absorption property in the intermediate-frequency range, the result was poor at 0.74. When the average sound absorption coefficient (γ) from 4,500 Hz to 5,600 Hz was evaluated as the sound absorption property in the high-frequency range, the result was favorable at 0.94. When the average sound absorption coefficient (η) from 9,000 Hz to 11,200 Hz was evaluated as the sound absorption property in the ultra-high-frequency range, the result was favorable at 0.88.

[Comparative Example 5] (Reverse Arrangement of Example 8)

When sound was input from the side of the second fiber layer of the sample obtained in Example 8, the normal incidence sound absorption coefficient was measured, the sound absorption coefficient from 900 Hz to 1,120 Hz was measured as the sound absorption property in the low-frequency range, and the average sound absorption coefficient (α) was evaluated, the result was favorable at 0.52. When the normal incidence sound absorption coefficient was measured, the average sound absorption coefficient (β) from 2,800 Hz to 3,550 Hz was evaluated as the sound absorption property in the intermediate-frequency range, the result was favorable at 0.92. When the average sound absorption coefficient (γ) from 4,500 Hz to 5,600 Hz was evaluated as the sound absorption property in the high-frequency range, the result was poor at 0.81. When the average sound absorption coefficient (η) from 9,000 Hz to 11,200 Hz was evaluated as the sound absorption property in the ultra-high-frequency range, the result was poor at 0.67.

[Comparative Example 6] (Only Substrate Layer (Substrate Layer N))

Using the air laid testing machine, the prepared substrate layer N having a basis weight of 423 g/m² and a thickness of 10 mm was punched out into a circle having a diameter 16.6 mm to obtain a sound absorption coefficient measurement sample. When the normal incidence sound absorption coefficient of this sample was measured, the sound absorption coefficient from 900 Hz to 1,120 Hz was measured as the sound absorption property in the low-frequency range, and the average sound absorption coefficient (α) was evaluated, the result was poor at 0.16. When the normal incidence sound absorption coefficient was measured, the average sound absorption coefficient (β) from 2,800 Hz to 3,550 Hz was evaluated as the sound absorption property in the intermediate-frequency range, the result was poor at 0.42. When the average sound absorption coefficient (γ) from 4,500 Hz to 5,600 Hz was evaluated as the sound absorption property in the high-frequency range, the result was poor at 0.64. When the average sound absorption coefficient (η) from 9,000 Hz to 11,200 Hz was evaluated as the sound absorption property in the ultra-high-frequency range, the result was poor at 0.84.

[Comparative Example 7] (Only Substrate Layer (Substrate Layer P))

Using the air laid testing machine, the prepared substrate layer P having a basis weight of 250 g/m² and a thickness of 5 mm was punched out into a circle having a diameter of 16.6 mm to obtain a sound absorption coefficient measurement sample. When the normal incidence sound absorption coefficient of this sample was measured, the sound absorption coefficient from 900 Hz to 1,120 Hz was measured as the sound absorption property in the low-frequency range, and the average sound absorption coefficient (α) was evaluated, the result was poor at 0.06. When the normal incidence sound absorption coefficient was measured, the average sound absorption coefficient (β) from 2,800 Hz to 3,550 Hz was evaluated as the sound absorption property in the intermediate-frequency range, the result was poor at 0.17. When the average sound absorption coefficient (γ) from 4,500 Hz to 5,600 Hz was evaluated as the sound absorption property in the high-frequency range, the result was poor at 0.26. When the average sound absorption coefficient (η) from 9,000 Hz to 11,200 Hz was evaluated as the sound absorption property in the ultra-high-frequency range, the result was poor at 0.64.

[Comparative Example 8] (Only Substrate Layer (Substrate Layer Q))

Using the air laid testing machine, the prepared substrate layer Q having a basis weight of 500 g/m² and a thickness of 10 mm was punched out into a circle having a diameter of 16.6 mm to obtain a sound absorption coefficient measurement sample. When the normal incidence sound absorption coefficient of this sample was measured, the sound absorption coefficient from 900 Hz to 1,120 Hz was measured as the sound absorption property in the low-frequency range, and the average sound absorption coefficient (α) was evaluated, the result was poor at 0.14. When the normal incidence sound absorption coefficient was measured, the average sound absorption coefficient (β) from 2,800 Hz to 3,550 Hz was evaluated as the sound absorption property in the intermediate-frequency range, the result was poor at 0.44. When the average sound absorption coefficient (γ) from 4,500 Hz to 5,600 Hz was evaluated as the sound absorption property in the high-frequency range, the result was poor at 0.68. When the average sound absorption coefficient (η) from 9,000 Hz to 11,200 Hz was evaluated as the sound absorption property in the ultra-high-frequency range, the result was favorable at 0.88.

[Comparative Example 9] (the Average Flow Pore Diameter of the First Fiber Layer was the Upper Limit or More)

A substrate layer P was interposed between a first fiber layer (fiber layer L) and a second fiber layer (fiber layer B), and they were superimposed in order of the first fiber layer L/the substrate layer P/the second fiber layer B, and thereby a sound absorption coefficient measurement sample was obtained in the same manner as in Example 1.

When sound was input from the side of the first fiber layer of the obtained sample, the normal incidence sound absorption coefficient was measured, the sound absorption coefficient from 900 Hz to 1,120 Hz was measured as the sound absorption property in the low-frequency range, and the average sound absorption coefficient (α) was evaluated, the result was favorable at 0.30. When the normal incidence sound absorption coefficient was measured, the average sound absorption coefficient (β) from 2,800 Hz to 3,550 Hz was evaluated as the sound absorption property in the intermediate-frequency range, the result was favorable at 0.97. When the average sound absorption coefficient (γ) from 4,500 Hz to 5,600 Hz was evaluated as the sound absorption property in the high-frequency range, the result was poor at 0.87. When the average sound absorption coefficient (η) from 9,000 Hz to 11,200 Hz was evaluated as the sound absorption property in the ultra-high-frequency range, the result was favorable at 0.87.

Table 3 shows a summary of configurations and sound absorption properties of the laminated acoustic absorption members of Comparative Examples 1 to 9. In addition, configurations of respective layers are shown together.

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| First fiber layer | Type | B | — | — | — | B | — | — | — | L |
|  | Basis weight (g/m²) | 3.0 | — | — | — | 3.0 | — | — | — | 80 |
|  | Average flow pore diameter (μm) | 0.7 | — | — | — | 0.7 | — | — | — | 12.6 |
|  | Density (g/cm³) | 0.22 | — | — | — | 0.22 | — | — | — | 0.04 |
|  | Porosity (%) | 88 | — | — | — | 88 | — | — | — | 96 |
|  | Air permeability (μm/Pa · s) obtained by Gurley type method | 60 | — | — | — | 60 | — | — | — | >1,000 |
| Substrate layer | Type | M | M | Commercial product | Commercial product | N | N | P | Q | P |
|  | Basis weight (g/m²) | 373 | 373 | 150 | 332 | 423 | 423 | 250 | 500 | 250 |
|  | Density (g/cm³) | 0.07 | 0.07 |  |  | 0.04 | 0.04 | 0.05 | 0.05 | 0.05 |
|  | Porosity (%) | 94 | 94 |  |  | 96 | 96 | 96 | 96 | 96 |
|  | Air permeability (cc/cm² · s) obtained by Frazier method | 70 | 70 |  |  | 83 | 83 | 95 | 78 | 95 |

TABLE 3-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
|  | Air permeability (μm/Pa · s) obtained by Gurley type method | >1,000 | >1,000 |  |  | >1,000 | >1,000 | >1,000 | >1,000 | >1,000 |
| Second fiber layer | Type | C | — | — | — | C | — | — | — | B |
|  | Basis weight (g/m²) | 1.0 | — | — | — | 1.0 | — | — | — | 3.0 |
|  | Average flow pore diameter (μm) | 2.4 | — | — | — | 2.4 | — | — | — | 0.7 |
|  | Density (g/cm³) | 0.18 | — | — | — | 0.18 | — | — | — | 0.22 |
|  | Porosity (%) | 90 | — | — | — | 90 | — | — | — | 88 |
|  | Air permeability (μm/Pa · s) obtained by Gurley type method | 1,000 | — | — | — | 1,000 | — | — | — | 60 |
| Normal incidence sound absorption coefficient | Average sound absorption coefficient (α) in low-frequency range | 0.39 | 0.11 | 0.12 | 0.21 | 0.52 | 0.16 | 0.06 | 0.14 | 0.30 |
|  | Average sound absorption coefficient (β) in intermediate-frequency range | 0.97 | 0.28 | 0.47 | 0.74 | 0.92 | 0.42 | 0.17 | 0.44 | 0.97 |
|  | Average sound absorption coefficient (γ) in high-frequency range | 0.90 | 0.41 | 0.69 | 0.94 | 0.81 | 0.64 | 0.26 | 0.68 | 0.87 |
|  | Average sound absorption coefficient (η) in ultra-high-frequency range | 0.73 | 0.80 | 0.88 | 0.88 | 0.67 | 0.84 | 0.64 | 0.88 | 0.87 |

INDUSTRIAL APPLICABILITY

Since the laminated acoustic absorption member of the present invention has an excellent sound absorption property in the low-frequency range to the ultra-high-frequency range, and particularly has an excellent sound absorption property in the high-frequency range, it can be used as an acoustic absorption member in fields in which sound input causes a problem. Specifically, the member can be used as an acoustic absorption member used for a ceiling, a wall, a floor and the like of a house, a soundproof wall for a highway, a railway line, and the like, a soundproof material for home appliances, an acoustic absorption member disposed in each part of a vehicle such as a train and an automobile, and the like.

The invention claimed is:

1. A laminated acoustic absorption member comprising at least a first fiber layer and a second fiber layer, and at least one substrate layer interposed between the first fiber layer and the second fiber layer,
   wherein the first fiber layer has an average flow pore diameter of 0.5 to 10 μm and a basis weight of 0.1 to 200 g/m²,
   wherein the second fiber layer has an average flow pore diameter of 0.5 to 10 μm, which is smaller than the average flow pore diameter of the first fiber layer, and has a basis weight of 0.1 to 200 g/m²,
   wherein the substrate layer has an air permeability of 40 cc/cm²·s or more obtained by a Frazier method and has a basis weight of 1 to 700 g/m², and
   wherein the first fiber layer is disposed on a sound-incidence side and the second fiber layer is disposed on a sound-transmission side.

2. The laminated acoustic absorption member according to claim 1,
   wherein the first fiber layer, the second fiber layer, and the substrate layer are independently at least one selected from the group consisting of a non-woven fabric and a woven fabric.

3. The laminated acoustic absorption member according to claim 1,
   wherein the substrate layer includes fibers formed of at least one fiber selected from the group consisting of polyethylene terephthalate, polybutylene terephthalate, polyethylene, and polypropylene, or fibers in which at least two thereof are combined, and the first fiber layer and the second fiber layer independently include at least one fiber selected from the group consisting of polyvinylidene fluoride, Nylon 6,6, polyacrylonitrile, polystyrene, polyurethane, polysulfone, polyvinyl alcohol, polyethylene terephthalate, polybutylene terephthalate, polyethylene, and polypropylene.

4. The laminated acoustic absorption member according to claim 1,
   wherein, in a normal incidence sound absorption coefficient measurement method, a sound absorption coefficient at a frequency of 900 Hz to 1,120 Hz is measured, an average sound absorption coefficient (α) of the sound absorption coefficient is calculated, and the value of the average sound absorption coefficient (α) is in a range that satisfies the following formula:

$$1.00 \geq \alpha \geq 0.22.$$

5. The laminated acoustic absorption member according to claim 1,
   wherein, in a normal incidence sound absorption coefficient measurement method, a sound absorption coefficient at a frequency of 2,800 Hz to 3,550 Hz is measured, an average sound absorption coefficient (β) of the sound absorption coefficient is calculated, and the value of the average sound absorption coefficient (β) is in a range that satisfies the following formula:

$$1.00 \geq \beta \geq 0.60.$$

6. The laminated acoustic absorption member according to claim 1,
   wherein, in a normal incidence sound absorption coefficient measurement method, a sound absorption coefficient at a frequency of 4,500 Hz to 5,600 Hz is measured, an average sound absorption coefficient (γ) of the sound absorption coefficient is calculated, and the value of the average sound absorption coefficient (γ) is in a range that satisfies the following formula:

$1.00 \geq \gamma \geq 0.90$.

7. The laminated acoustic absorption member according to claim 1,
wherein, in a normal incidence sound absorption coefficient measurement method, a sound absorption coefficient at a frequency of 9,000 Hz to 11,200 Hz is measured, an average sound absorption coefficient (η) of the sound absorption coefficient is calculated, and the value of the average sound absorption coefficient (η) is in a range that satisfies the following formula:

$1.00 \geq \eta \geq 0.85$.

* * * * *